United States Patent [19]

Warrell et al.

[11] 4,367,188

[45] Jan. 4, 1983

[54] ELECTRIC STORAGE BATTERIES

[75] Inventors: Suzanne Warrell, Chorley; Roy Shipperbottom, Worsley, both of England

[73] Assignee: Chloride Group Public Limited Company, London, England

[21] Appl. No.: 167,726

[22] Filed: Jul. 11, 1980

[30] Foreign Application Priority Data

Jul. 17, 1979 [GB] United Kingdom ............... 7924795

[51] Int. Cl.³ .............................................. H01N 4/04
[52] U.S. Cl. .................................. 264/104; 264/105
[58] Field of Search ........................... 264/104, 105

[56] References Cited

U.S. PATENT DOCUMENTS

| | | | |
|---|---|---|---|
| 3,087,003 | 4/1963 | Drengler et al. | 264/104 |
| 3,184,339 | 5/1965 | Ellis | 264/104 |
| 3,271,195 | 9/1966 | Berchielli et al. | 264/104 |
| 3,607,412 | 9/1971 | Holloway | 264/104 |

Primary Examiner—James H. Derrington
Attorney, Agent, or Firm—Oblon, Fisher, Spivak, McClelland & Maier

[57] ABSTRACT

A method of making an electrode for a lead acid battery which comprises compressing an active material composition into adherent contact with an apertured electrical conductor characterized in that compression is applied to the active material and electrical conductor so as to compress the active material to planar form adherent to the conductor except in the region where it is wished to form an aperture through the active material where compression is not applied or is applied to a lesser extent such that the active material can be readily displaced from the non-compressed region by means which do not displace the active material from the remainder of the compressed electrode.

7 Claims, 2 Drawing Figures

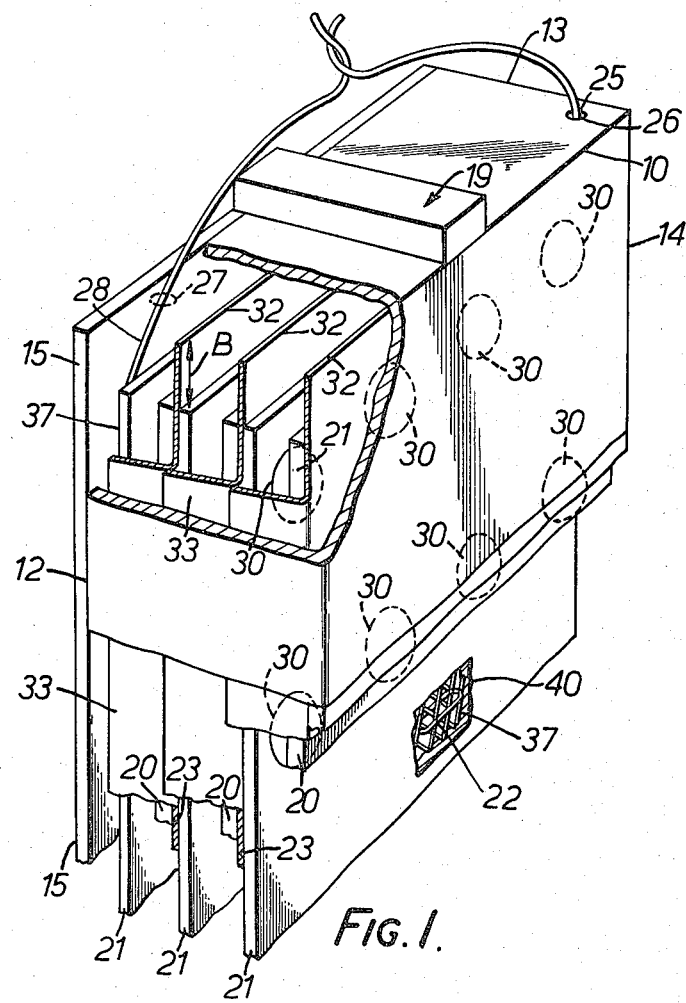
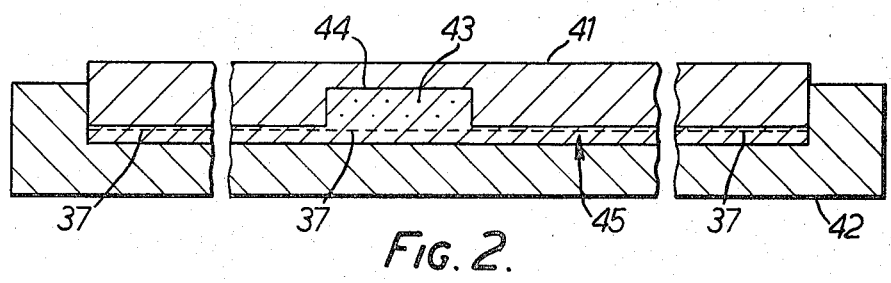

ELECTRIC STORAGE BATTERIES

TECHNICAL FIELD

This invention relates to electric storage batteries and in particular to seawater activatable batteries and describes an improved method for making the cathode of such a battery.

BACKGROUND OF THE PRIOR ART

Seawater batteries of the type having a magnesium or magnesium alloy anode and a lead chloride cathode are conventionally separated by polymer spacers from adjacent electrodes of opposite polarity but are connected to each other through the intercell partition, which may typically be a thin film of electrolyte resistant polymer, by a metal connector. This metal connector passes through the metal conducting support of the cathode and is in electrical contact therewith and with the anode. In order to prevent corrosion problems at this metal connector, which typically may be a staple, it is necessary for the active material of the cathode to be removed around the connecting location so that a window is formed in the cathode in which the staple can be located in a position such that it does not contact the active material.

DISCLOSURE OF THE INVENTION

According to the present invention a method of making an electrode for a lead acid battery which comprises compressing an active material composition into adherent contact with an apertured electrical conductor is characterised in that compression is applied or is applied to the active material and electrical conductor so as to compress the active material to planar form adherent to the conductor except in the region where it is wished to form an aperture through the electrode where compression is not applied or is applied to a lesser extent such that the active material can be readily displaced from the non-compressed region by means which do not displace the active material from the remainder of the compressed electrode.

The active material, when the invention is applied to a cathode for a lead chloride seawater battery, preferably comprises a dry granulated blend of lead chloride and 1 to 5% by weight of polymeric, preferably elastomeric, binder e.g. neoprene rubber. The granulated material may be made by first blending the lead chloride with the neoprene rubber to make a damp mixture and then mechanically sieving the mixture followed by drying. The electrical support is preferably of copper in the form of an expanded mesh and the intercell connector is preferably a metal staple.

The process preferably comprises locating the mesh in a mould of the desired shape of the electrode, inserting the granules of active material into the mould to the depth required to produce the required finished plate thickness after compression and compressing the composite array in the mould to planar adherent form with a ram having means effective not to apply compression to one or more desired regions of the total area of the electrode. This desired region is preferably a window typically 1 to 2 cms long and 1 to 2 cms wide in a plate having a size of 5 to 10 cms in length and width. The means in the ram effective to prevent compression may either merely be a recess or may be a plunger positioned during the compression step in a retracted position so as to afford a recess but capable of being extended between the compression cycles so as to eject any active material which sticks in the recess.

In an alternative arrangement a retractable ram or rams could be formed in the bottom of the mould and could be arranged to retract in synchronism with the downward movement of a plane top ram so as to prevent cutting of the mesh and compression of the active material in the region or regions above these retractable rams.

Once the material has been compressed onto the mesh the uncompressed region may be blown away by a jet of air directed at the electrode in the mould or maybe shaken off during transfer of the electrode to the assembly stage. We have found that this process results in a clean even edge to the window and enables the process to be carried out reliably and on a continuous production scale. The electrode which is now typically 1.4 mm thick and has an area of about 60 sq. cm is now stapled with a metal staple to a magnesium or magnesium alloy anode. This preferably contains 0.05 to 3.5% by weight manganese preferably 0.2 to 2.0% e.g. 1.3 to 1.7% manganese and at least 96.3% by weight magnesium, and preferably not more than 0.2% by weight of impurities.

The formulation of active material required for the process requires that the material before compression should be a dry material of reproducable particle size which when compacted will form a cohesive handleable tablet. The formulation indicated above fulfills this requirement.

DISCLOSURE OF THE BEST MODE

The invention may be put into practice in various ways and one specific embodiment will be described to illustrate the invention with reference to the accompanying diagrammatic drawings, in which:

FIG. 1 is a perspective view in partial cross-section and shows about half of a seawater activatable battery embodying an electrode made in accordance with the present invention, the thickness of the electrode being exaggerated for easier representation; and FIG. 2 is a diagrammatic cross-section through a mould showing the final stage of compression of the active material into adherence with the mesh support.

The battery shown in FIG. 1 has an injection moulded thermoplastic box as its container having top and bottom walls 10 and 11 (not shown), side walls 12 and 13 and a back wall 14 all moulded in one piece and a separate front wall 15 adapted to be welded or glued to the open edges of the walls 10, 11, 12 and 13.

The top and bottom walls are typically 4.4 cms by 8 cms, the side walls 8.5 cms by 4.4 cms and the front and back walls 8.5 cms by 8 cms. The wall thickness is 1–1.5 mm. Electrolyte access is from the walls 10 and 11 as described below providing for ingress of seawater at the bottom of the battery and egress of sea water and gas at the top of the battery.

The active component of the battery comprises a stack of positive and negative electrodes, 20,21 connected to each other by a staple 22 through the centre of an intercell partition 23, disposed between the two electrodes. A positive electrode is against the back wall 14 and a positive terminal 26 is lead out through a hole 25 in the wall 10 and a negative terminal 27 is lead out through a hole 28 in the same wall. These holes are sealed with resin, e.g. epoxy resin, after the cell is assembled. The positive and negative electrodes in a cell are separated from each other by PVC rods or peferably by pimples 30 of generally hemispherical shape formed of hot melt adhesive adhered to the metallic anode.

The intercell partitions 23 are made of sheets of cellulose acetate the top ends 32 and the bottom ends of which are a flush fit to the inside faces of the top and bottoms walls 10 and 11 of the box. Each of the top and bottom ends of the partitions are carefully cut to size and superposed in register so that when the stack is placed in the box the maximum spacing from the inside walls is no more than 0.010 inches. (0.25 mm). The distance B from the ends of each of the positive and negative electrodes from the inside faces of the walls 10 and 11 is also carefully controlled so as not to be less than 3 mms so that the leakage pathway from the end of a positive electrode 20 around the end of its partition 23 to the negative electrode is always at least 5.5 mms.

The sides of the partitions 23 extend out so that in order for the stack to be fitted into the box they have to be bent over as shown in FIG. 1. The bent over portions 33 preferably overlap bent over portions of at least the cell above and preferably two cells above.

The top and bottom walls have transverse channels 17 and 18 protruding outwardly but with an inwardly opening face providing slots 19 and 40, 6 mms, e.g. 3-9 mms, wide opening into the battery and extending across the ends of the intercell partitions. The ends of the channels 19 and 40 are closed at the rear face and open at the front face of the battery. These channels provide electrolyte access to the cells. The channels are 3 e.g. 1-6 mms deep.

The cell next to the wall 14, which optionally may be spaced therefrom by a sheet of cellulose acetate, consists of a cathode 20, 7.6 cms square, and then a sheet, 7.6 cms square, of magnesium 0.025 inches thick as the anode 21, separated by four rows of five pimples of hot melt adhesive 30, each 1.5 mms thick and 6 mms across, from the lead chloride cathode 20, which is 1.4 mm thick. This cathode is separated from the next anode 21 by the cellulose acetate sheet 23 which is 0.004 inches thick.

Each cathode consists of an expanded copper mesh current collector 37 to which is adhered the lead chloride active material composition.

A series connection between each cathode 20, except the first one, and each anode 21 is made through the window 40 in the centre of the cathode 20 by stapling the mesh 37 through the sheet 23 to the anode 21. This is done for each pair of cathodes and anodes. The anode terminal 27 is welded to one corner of the anode 21 nearest the wall 15 and passes out of the box through the hole 28 and the cathode terminal 26 is welded to the mesh 37 bared at one corner of the cathode 20 nearest the back wall 14 at the same or opposite corner, and passes out of the box through the hole 25.

The Example below illustrates a suitable lead chloride cathode active material.

EXAMPLE

The active material consists of 97.5% by weight lead chloride (99.9% pure), and 2.5% neoprene rubber.

The lead chloride powder and neoprene rubber, added as an aqueous latex are mixed together, and then sieved and dried to produce a regular particle size free flowing powder. The mesh 37 is placed in the mould 42 (see FIG. 2) and the mould filled with active material powder.

Referring to FIG. 2 the ram 41 with its recess 44 is now brought down to compress the powder as shown at 45 in FIG. 2. The ram is then withdrawn the cathode removed from the mould and the uncompressed powder 43 shaken out to leave the window 40 shown in FIG. 1.

The battery is assembled as follows: The spacers 30 are formed on each anode 21 by heating the anode to 80°–90° C. and then depositing molten drops of hot melt adhesive e.g. at 150°–160° C. on the anode whereby circular pimples about 1.5 mm thick are formed which adhere well to the anode having a large surface of contact but which interfere very little with electrolyte flow through the cell as compared with conventional PVC rods. Preheating the anode is thought to assist in achieving a good shape for the spacer 30 and good contact. The cellulose acetate intercell partitions are cut to size, each cathode stapled through its window 40 and a partition 23 to an anode having its spacers 30 facing outwardly, care being taken to ensure that the components are correctly positioned as discussed above.

The cathode terminal is welded onto the first cathode which is placed in the cell against the inside face of the back wall 14. The stack of electrode pairs are then placed in the box with the side portions 33 of the partitions 23 folded up against the inside face of the side walls 12 and 13 of the box. The remaining electrode pairs are then pushed down into the box so that each pair is overlapped at its edges by the folded over portion 33 of the partition of the previous pair. If desired they can be preassembled into a pack with the overlapped portions welded together e.g. by application of a solvent such as acetone.

The anode terminal is then formed. Finally the front face 15 is secured in place e.g. by welding or adhesive and the terminal holes 25 and 28 sealed.

What we claim as our invention and desire to secure by Letters Patent is:

1. A method of making an electrode for a lead acid battery having an aperture at a desired location, which comprises:

compressing an active material composition into adherent contact with an electrically conducting mesh support characterized in that compression is applied to the active material and electrically conductive mesh support so as to compress the active material to planar form adherent to the mesh support except in the desired location of the aperture through the active material where compression is not applied or is applied to a lesser extent such that the active material can be readily displaced from the non-compressed region by means which do not displace the active material from the remainder of the compressed electrode.

2. A method as claimed in claim 1 applied to the production of a lead chloride seawater battery in which the active material comprises a dry granulated blend of lead chloride and 1 to 5% by weight of polymeric binder.

3. A method as claimed in claim 2 in which the granulated material is made by first blending the lead chloride with the binder to make a damp mixture and then mechanically sieving the mixture followed by drying.

4. A method as claimed in claim 1 which comprises locating said electrically conducting mesh support in a mould of the desired shape of the electrode, inserting the granules of active material into the mould to the depth required to produce the required finished plate thickness after compression and compressing the composite array in the mould to planar adherent form with a ram having means effective not to apply compression to one or more desired regions of the total area of the electrode.

5. A method as claimed in claim 4 in which the desired region is a window 1 to 2 cms long and 1 to 2 cms wide in a plate having a size of 5 to 10 cms in length and width.

6. A method as claimed in claim 2, wherein said polymeric material is neoprene rubber.

7. A method as claimed in claim 1, wherein said electrically conducting mesh support is a copper mesh.

* * * * *